United States Patent [19]

Calvert et al.

[11] 4,304,888
[45] Dec. 8, 1981

[54] POLYMERIZATION PROCESS

[75] Inventors: Anthony J. Calvert; Eric C. Collingwood, both of Reading, England

[73] Assignee: The Gillette Company, Boston, Mass.

[21] Appl. No.: 137,962

[22] Filed: Apr. 7, 1980

[30] Foreign Application Priority Data

Apr. 19, 1979 [GB] United Kingdom ............... 13553/79

[51] Int. Cl.³ .............................................. C08F 8/32
[52] U.S. Cl. .................................................. 525/382
[58] Field of Search ........................................ 525/382

[56] References Cited

U.S. PATENT DOCUMENTS

| | | | |
|---|---|---|---|
| 3,311,572 | 3/1967 | Storey et al. | 525/382 |
| 3,406,139 | 10/1968 | Hurwitz et al. | 260/29.6 |
| 3,519,610 | 7/1970 | Huntzinger | 525/382 |
| 4,041,006 | 8/1977 | Fong et al. | 260/33.6 UA |
| 4,192,933 | 3/1980 | Edelman | 525/382 |

FOREIGN PATENT DOCUMENTS 1010058  11/1965  United Kingdom .

*Primary Examiner*—William F. Hamrock
*Attorney, Agent, or Firm*—Mandel E. Slater; Leonard J. Janowski

[57]  ABSTRACT

This application is concerned with improved processes for the preparation of polyvinyl imidazolines and polyvinyl tetrahydropyrimidines by reacting polyacrylonitriles with alkylene diamines in the presence of carbon dioxide.

7 Claims, No Drawings

POLYMERIZATION PROCESS

The present invention is concerned with a process for the preparation of polyvinyl imidazolines and polyvinyl tetrahydropyrimidine having repeating units of formula I:

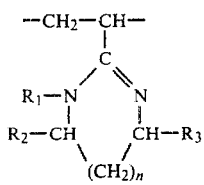

in which n is 0 (polyvinyl imidazoline) or 1 (polyvinyl tetrahydropyrimidine and $R_1$, $R_2$, $R_3$, which may be the same or different, are hydrogen or an alkyl group having up to 4 carbon atoms.

Polymers having repeating units of formula I and their salts are known and are described, together with a method for their preparation, in, for example, U.S. Pat. No. 3,406,139 and British Specification No. 1,010,058. The process described in these specifications essentially comprises reacting polyacrylonitrile with ethylenediamine or substituted derivative thereof (to obtain polyvinyl imidazolines) or 1,3-diaminopropane or substituted deritive thereof (to obtain polyvinyl tetrahydropyrimidines) in the presence of elemental sulphur or a sulphur compound as catalyst. The amine reactant is preferably used in stoichiometric excess and the reaction may be carried out in an inert organic solvent, such as dimethyl sulphoxide, or in a large excess of the amine as the solvent. Suitable reaction temperatures are from 80° to 160° C., a temperature of about 100° C. being preferred, and the reaction is preferably carried out under an inert atmosphere, such as argon.

The products obtained by the process described in said U.S. and British patent specifications tend to be contaminated with sulphur and/or hydrogen sulphide (formed in the course of the reaction). While such contaminants may not be unacceptable for industrial use of the polymers, they are for cosmetic and other uses, particularly from the point of view of the odor they impart.

While these contaminants can be removed by conventional purification procedures, we have found that it is difficult to remove the last traces of them and rigorous purification procedures also add substantially to the cost of the polymer products.

We have now found that the reaction of polyacrylonitrile with ethylene diamine or 1,3-diaminopropane or their substituted derivatives is effectively catalyzed by carbon dioxide. This catalyst does not give rise to any undesirable contaminants in the products and no special purification procedure is needed in order to obtain the desired compounds in a form suitable for use in cosmetics and other uses where an odorfree product is required.

According to the present invention, therefore, there is provided a process for the preparation of a polymer having repeating units of formula I, which comprises reacting polyacrylonitrile with an amine of formula II:

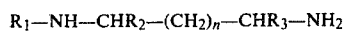

in which n is 0 or 1 and $R_1$, $R_2$ and $R_3$, which may be the same or different, are hydrogen or an alkyl group having up to 4 carbon atoms, in the presence of carbon dioxide as catalyst.

The process is preferably used to prepare polymers in which $R_1$, $R_2$ and $R_3$ are hydrogen, that is by using ethylene diamine or 1,3-diaminopropane as the amine II.

Apart from the substitution of carbon dioxide for sulphur or a sulphur-containing compound as the catalyst, the process may be carried out as described in said U.S. and British patent specifications. That is to say, the amine II is preferably used in stoichiometric excess and the reaction is preferably carried out in an inert organic solvent, such as dimethyl sulphoxide, or in a large excess of the amine II as the solvent. The reaction temperature is suitably from 80° to 160° C., a temperature of about 100° C. being preferred.

The carbon dioxide catalyst may be introduced into the reaction mixture in any convenient way. One suitable method comprises introducing a stream of gaseous carbon dioxide into the mixture at a constant, metered, flow rate for the time required to provide the desired weight of catalyst. Alternatively, and preferably, a weighed amount of solid carbon dioxide (dry ice) is simply added to the reaction mixture. The carbon dioxide dissolves in the reaction mixture forming a salt with the amine II and so effectively remains in solution throughout the reaction, even when the reaction mixture is heated to an elevated temperature, such as 100° C.

The amount of carbon dioxide catalyst used is not critical.

The reaction is preferably carried out in a closed vessel, from which air has been displaced by an inert gas, such as argon, an atmosphere of the inert gas being maintained over the reaction mixture during the course of the reaction.

The polyacrylonitrile starting material used in the process may be a homopolymer of acrylonitrile or a copolymer of a major proportion on a molar basis of acrylonitrile and a minor proportion of one or more other monomers copolymerisable therewith. Preferred comonomers are acrylic and methacrylic acid esters, in particular methyl acrylate. Commercially available polyacrylonitrile is a suitable and convenient starting material; one particular commercially available polyacrylonitrile we have used is a copolymer of 91% acrylonitrile, 7% methyl acrylate and 2% itaconic acid. When an acrylonitrile copolymer is used as the starting material, the structural units derived from the comonomer(s) will occur in the polyvinyl imidazoline or polyvinyl tetrahydropyrimidine product.

The polymers used as starting materials preferably have a molecular weight of from 20,000 to 500,000.

On completion of the reaction, the product may be recovered and worked up in conventional manner. Since the polymers are insoluble in non-polar organic solvents, such as acetone and ethyl acetate, a preferred procedure is to introduce the reaction mixture into a non-polar organic solvent in order to precipitate the polymer products, separating the polymer solids, redissolving the product in a polar organic solvent, such as ethanol, reprecipitating in a non-polar organic solvent, separating the polymer solids, and drying.

Polymers having repeating units of formula I obtained by the process according to the invention are particularly suitable for use as the active ingredients of hair conditioning compositions.

In order that the invention may be more fully understood, the following example is given by way of illustration only.

EXAMPLE

A solution of 80 g of polyacrylonitrile in 1600 ml of dimethyl sulfoxide was placed in a 3 liter flanged neck reaction vessel. The vessel was fitted with a gas inlet, temperature probe, reflux condenser, and stirrer. To this solution, 480 ml of ethylene diamine were added with rapid stirring. The vessel and its contents were degassed by passing a stream of argon through the mixture. The argon flow was stopped and 13 g of solid carbon dioxide was rapidly added with stirring.

The reaction vessel was then placed in an oil bath at 100° C. A slow stream of argon was passed through the reactor during the reaction in order to remove the ammonia formed. After 20 hours, the reactor was removed from the oil bath and cooled.

The polyvinyl imidazoline formed was precipitated from the reaction mixture by adding the latter slowly to 12 volumes of rapidly stirred acetone (i.e. approximately 2 liters of reaction mixture were added to 24 liters of acetone). The precipitate was filtered off and washed with acetone on a buchner funnel. The damp polymer cake obtained was dissolved in 1 liter of ethanol.

The polymer was precipitated from the ethanol solution by adding the latter to 12 volumes (i.e. 12 liters) of ethyl acetate. The precipitate was filtered off on a buchner funnel and washed with ethyl acetate. The polymer cake was then dried in a vacuum oven at 50° C. to constant weight.

Yield 133 g, corresponding to 92% based on the polyacrylonitrile starting material.

Having thus disclosed our invention what is claimed is:

1. A process for preparing polyvinyl imidazolines and polyvinyl tetrahydropyrimidines having a major portion of repeating units of the formula:

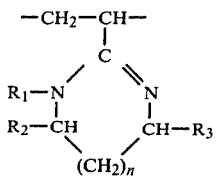

in which n is 0 or 1 and $R_1$, $R_2$ and $R_3$, which may be the same or different, are hydrogen or an alkyl group having up to 4 carbon atoms; said process comprising reacting polyacrylonitrile or a copolymer of a major proportion on a molar basis of acrylonitrile and a minor proportion of one or more monomers copolymerizable therewith, with an amine of the formula:

$$R_1-NH-CHR_2-(CH_2)_n-CHR_3-NH_2$$

in which n is 0 or 1 and $R_1$, $R_2$ and $R_3$, which may be the same or different, are hydrogen or an alkyl group having up to 4 carbon atoms, in the presence of carbon dioxide.

2. A process as defined in claim 1 wherein said amine is present in a stoichiometric excess.

3. A process as defined in claim 1 wherein said process is carried out in an inert gas.

4. A process as defined in claim 1 wherein said amine is ethylene diamine.

5. A process as defined in claim 1 wherein said amine is 1,3-diaminopropane.

6. A process as defined in claim 1 wherein the polymeric starting materials have a molecular weight from 20,000 to 500,000.

7. A process as defined in claims 1, 2, 3, 4, 5 or 6 wherein the reaction is carried out at a temperature of 80° to 160° C.